(No Model.)

W. C. FISH.
ELECTRIC METER.

No. 575,777. Patented Jan. 26, 1897.

WITNESSES.
Henry Westendarp
B. B. Hull

INVENTOR
Walter C. Fish
By Geo. R. Blodgett
Atty.

UNITED STATES PATENT OFFICE.

WALTER C. FISH, OF LYNN, MASSACHUSETTS, ASSIGNOR TO THE GENERAL ELECTRIC COMPANY, OF NEW YORK.

ELECTRIC METER.

SPECIFICATION forming part of Letters Patent No. 575,777, dated January 26, 1897.

Application filed October 16, 1896. Serial No. 609,115. (No model.)

*To all whom it may concern:*

Be it known that I, WALTER C. FISH, a citizen of the United States, residing at Lynn, in the county of Essex, State of Massachusetts, have invented certain new and useful Improvements in Electric Meters, (Case No. 465,) of which the following is a specification.

This invention relates to electric meters of the "Thomson" type, and has for its object to prevent the "creeping" of electric meters of this type, in which an initial starting-torque, intended to compensate for the friction of the moving parts, is produced by continuing the fine-wire shunt-circuit through a field-coil coincident in position with the main field-coil after leaving the armature of the meter, the fine-wire circuit comprising also and in larger part a non-inductive resistance, the inductive resistance and armature being located in the shunt-circuit and the field-coil being connected in series with the mains of the circuit in which the meter is connected.

The invention consists in an apparatus for periodically, during the movement of the meter, removing the influence of the initial-energy coil, or at least in weakening it, to the end that the meter shall be stopped except in case current flows through the coarse-wire coils of the meter, as when lights are turned on. This effect is accomplished by shunting a fine-wire field-coil at intervals by means of contacts closed and opened during the revolution of the meter mechanism.

Figure 1:
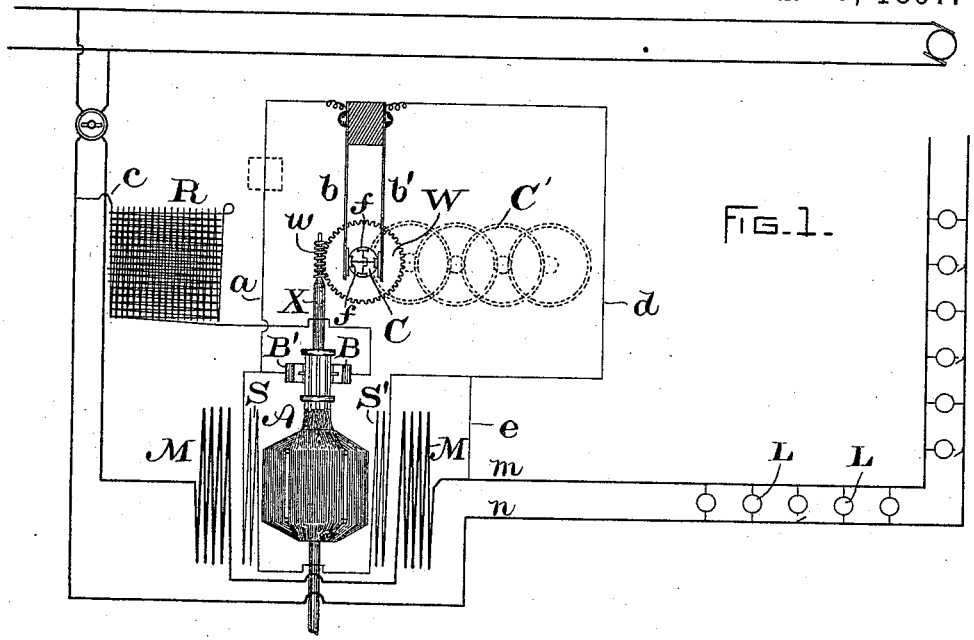
Figure 2:
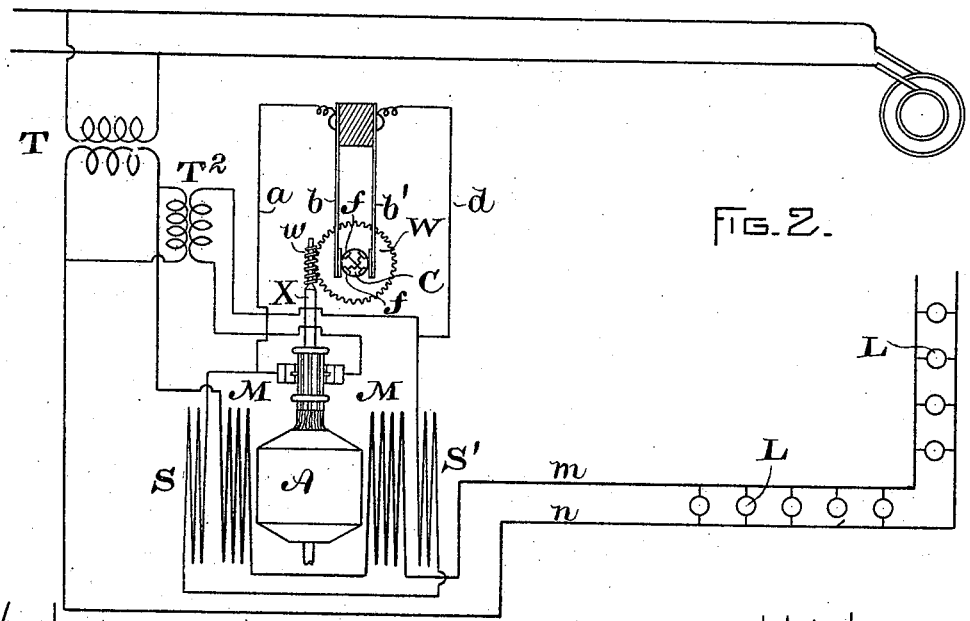

In the accompanying drawings, Figure 1 is a diagrammatic illustration of the manner of carrying out the invention. Fig. 2 is a modification thereof.

A is the armature of the meter; B B', its brushes; m n, the mains of the circuit in which the meter is connected, and L L lamps or other translating devices in said circuit, the current of which is to be measured by the meter.

M M are the main field-coils, and S S' fine-wire shunt-field coils coincident in position with the main field-coils M M, and forming a continuation of the fine-wire shunt-circuit c e, said circuit c e comprising in larger part a non-inductive resistance R, and said non-inductive resistance, armature A, and the field-coils being connected in shunt between the mains of the circuit in which the meter is connected. The circuit a d is a shunt-circuit between the brush B' and the main m; that is, a shunt-circuit around the fine-wire shunt-field coils S S.

Included in the circuit a d are brushes b b', bearing upon contacts f of a commutator C, mounted on a worm-wheel W, forming one of a train of gear-wheels C' of the meter-registry mechanism and shown in dotted lines. The worm-wheel W meshes with a worm w on the shaft X of the meter A. During the revolution of the wheel W the contacts alternately close and open a circuit between the brushes b b', which shunts at intervals the fine-wire field-coils S S', and thereby periodically during the movement of the meter removes the influence of the initial-energy coils, or at least weakens them so that the meter will be stopped, except when current flows through the coarse-wire coils of the meter, as when lights are turned on. With this arrangement the meter will "creep," as usual, until the circuit is completed between the brushes b b', and it then stops. The time during which circuit is established in this manner may of course be anything desired by selecting the number or breadth of the segments of the commutator borne upon the wheel W. If the ratio of gearing between the shaft X and the wheel W be as one to one hundred, then connection between the brushes b b' will be established once in every twenty-five revolutions of the meter, or rather more than this, allowing for the breadth of the segments, as indicated in the drawings.

It might be supposed that withdrawing the effect of the fine-wire field-coils would impair the accuracy of the registry of the meter, and such would be the case were it not for the fact that a ready means of compensation is found by adjusting the number of turns of the fine-wire field-coil. Thus assuming that these fine-wire field-coils are shunted one-third of the time and in circuit two-thirds of the time and that the meter-readings are five per cent. too low it is simply necessary to increase the number of turns of the fine-wire coil to compensate for this loss by an equal accelerating action during the time that the fine-wire field-coil is energized, and evidently this adjustment for accuracy of registration may be used with any number of closures between $b$ and $b'$ or for various durations of closure. The closure of said circuit one-third of the time has given accurate results. It is of course evident that the circuit through S S' need not be entirely short-circuited, but may be so weakened as to produce the same results as, for instance, are produced by a resistance in the branch $a\ d$.

While this invention has been shown as employed in an apparatus to measure a direct current, it may be adapted to one for measuring an alternating current, as illustrated in Fig. 2, where the inductive resistance is omitted, and instead a transformer T is located in the mains and a step-down transformer $T^2$ is in circuit with the mains and the armature A of the meter, with the same effect of weakening the field as in the case set forth in connection with Fig. 1. In Fig. 2 the brushes $b\ b'$ are shown in position between the contacts $f$ of the commutator C of worm-wheel W, in which position the shunt-field is in circuit, while in the position of the brushes $b\ b'$ shown in Fig. 1 the shunt-field is cut out.

The commercial use of electric meters of certain types has developed the fact that when the meter is installed in a position where it is subject to vibration, and also when the potential between the mains rises to a value higher than the normal potential, the meter is apt to "creep," as it is termed; that is, under such conditions it slowly moves and registers a consumption of energy when none should have been recorded. The object of the present improvement is to prevent this effect.

What I claim is—

1. In an electric meter, the combination of an armature, a field-coil therefor, recording mechanism actuated by the armature, and means for weakening the field periodically, or at intervals, as set forth.

2. In an electric meter, an armature in shunt to the mains, an initial-energy coil, and means for periodically or intermittently weakening the initial-energy coil during the movement of the meter, as set forth.

3. In an electric meter, an armature in shunt to the mains, a non-inductive resistance in the shunt-circuit, an initial-energy coil, and means for periodically or intermittently weakening the initial-energy coil, as set forth.

4. In an electric meter, an armature in shunt to the mains, a non-inductive resistance in the armature-circuit, a field-coil, and means for periodically or intermittently weakening the field, as set forth.

5. In an electric meter, an armature in shunt to the mains, a field-coil, and means for periodically or intermittently weakening the field during the movement of the meter, as set forth.

6. In an electric meter, an armature arranged in shunt to the mains, field-coils in the main circuit, supplemental field-coils in shunt to the mains, a non-inductive resistance in the armature-circuit, and means for periodically or intermittently weakening the field, as set forth.

In witness whereof I have hereunto set my hand this 14th day of October, 1896.

WALTER C. FISH.

Witnesses:
W. LEMP,
ALFRED PAUL.